(12) United States Patent
Onodera et al.

(10) Patent No.: US 7,043,903 B2
(45) Date of Patent: May 16, 2006

(54) CONTROL METHOD FOR AN EXHAUST GAS PURIFICATION SYSTEM AND AN EXHAUST GAS PURIFICATION SYSTEM

(75) Inventors: Takao Onodera, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 11/082,826

(22) Filed: Mar. 18, 2005

(65) Prior Publication Data
US 2005/0217253 A1  Oct. 6, 2005

(30) Foreign Application Priority Data
Apr. 6, 2004 (JP) .............................. 2004-112289

(51) Int. Cl.
*F01N 3/00* (2006.01)
(52) U.S. Cl. .............................. 60/295; 60/274; 60/285; 60/286; 60/297
(58) Field of Classification Search .................. 60/274, 60/285, 286, 295, 297, 303, 311
See application file for complete search history.

(56) References Cited

U.S. PATENT DOCUMENTS

| | | | | |
|---|---|---|---|---|
| 5,097,665 | A * | 3/1992 | Kammel ........................ | 60/275 |
| 5,711,149 | A * | 1/1998 | Araki ............................ | 60/278 |
| 6,032,461 | A * | 3/2000 | Kinugasa et al. ............. | 60/295 |
| 6,594,990 | B1 * | 7/2003 | Kuenstler et al. ............. | 60/295 |
| 6,622,480 | B1 * | 9/2003 | Tashiro et al. ................ | 60/295 |
| 6,681,565 | B1 * | 1/2004 | Russell ......................... | 60/286 |
| 6,763,659 | B1 * | 7/2004 | Watanabe et al. ............ | 60/297 |
| 6,952,918 | B1 * | 10/2005 | Imai et al. ..................... | 60/295 |
| 6,973,778 | B1 * | 12/2005 | Kondou et al. ............... | 60/295 |
| 2003/0230078 | A1 * | 12/2003 | Yahata et al. ................. | 60/295 |
| 2004/0144086 | A1 * | 7/2004 | Otake et al. .................. | 60/295 |

FOREIGN PATENT DOCUMENTS

| | | |
|---|---|---|
| JP | 2003-003829 | 1/2003 |
| JP | 2003-003833 | 1/2003 |
| JP | 2003-155914 | 5/2003 |
| JP | 2003-155916 | 5/2003 |

* cited by examiner

*Primary Examiner*—Tu M. Nguyen
(74) *Attorney, Agent, or Firm*—Staas & Halsey LLP

(57) ABSTRACT

An exhaust gas purification system (1) including a continuous regeneration-type DPF (13) and a DPF control (30*c*) is composed to perform an exhaust gas temperature raising control by multi-injection in the case where the collecting quantity ($\Delta P_m$) exceeds a first temperature rising judgment collecting quantity ($\Delta P01$) lower than a predetermined collecting quantity ($\Delta P1$) and, thereafter, to stop the exhaust gas temperature raising control by multi-injection in the case where the collecting quantity ($\Delta Pm$) becomes lower than a predetermined second temperature rising judgment collecting quantity ($\Delta P02$) lower than the predetermined first temperature rising judgment collecting quantity ($\Delta P01$).

Thereby, frequency of the manual regeneration switch operation can be reduced remarkably, and the operability for a driver can be improved, in the exhaust gas purification system (1) prompting the driver to stop the vehicle and perform the forced regeneration by the manual regeneration switch, in the case of detecting that the detected collecting quantity ($\Delta P_m$) is higher than the predetermined judgment collecting quantity ($\Delta P1$), concerning the regeneration of the continuous regeneration-type diesel particulate filter device (13).

2 Claims, 6 Drawing Sheets

CONTROL METHOD FOR AN EXHAUST GAS PURIFICATION SYSTEM AND AN EXHAUST GAS PURIFICATION SYSTEM

BACKGROUND OF THE INVENTION

The present invention relates to an exhaust gas purification system that purifies particulate matters (PM) from the exhaust gas discharged by diesel and other internal combustion engines using a continuous regeneration-type diesel particulate filter (DPF) and also to a control method thereof.

In the same way as for NOx, CO, and also HC etc., restrictions on the volume of particulate matters (hereinafter "PM") discharged from internal combustion engines such as diesel engines grow severe every year. Techniques for collecting this PM in a filter known as a diesel particulate filter (hereinafter "DPF") and for reducing the quantity thereof by discharging externally have been developed.

DPFs for collecting this PM include a monolithic honeycomb form wall flow type filter made of ceramic, a fiber form type filter made of fiber shape ceramic or metal, and so on. An exhaust gas purification system using these DPFs is installed on the way of the exhaust passage of an internal combustion engine, similarly to the other exhaust gas purification systems. In addition, the exhaust gas purification system cleans and discharges exhaust gas generated in the internal combustion engine.

These DPF devices include a continuous regeneration-type DPF device wherein an oxidation catalyst is installed upstream of the DPF, a continuous regeneration-type DPF device wherein the PM combustion temperature is lowered by the effect of a catalyst supported on a filter with catalyst and PM is burned by the exhaust gas, etc.

The continuous regeneration-type DPF device wherein the oxidation catalyst is installed upstream of the DPF uses the fact that the oxidation of PM by $NO_2$ (nitrogen dioxide) is executed at a lower temperature than the temperature in which PM is oxidized with oxygen in the exhaust gas. This DPF device is composed of an oxidation catalyst on the upstream side and a filter on the downstream side. No (nitrogen monoxide) in the exhaust gas is oxidized to $NO_2$, by an oxidation catalyst supporting platinum or the like. PM collected by the filter on the downstream side is oxidized by this $NO_2$ to $CO_2$ (carbon dioxide). Thereby, PM is removed.

Besides, the continuous regeneration-type DPF device of filter with catalyst is composed of a filter with catalyst such as cerium oxide ($CeO_2$). In this DPF device, PM is oxidized by a reaction ($4CeO_2+C \rightarrow 2Ce_2O_3+CO_2$, $2Ce_2O_3+O_2 \rightarrow 4CeO_2$, etc.) using $O_2$ (oxygen) in the exhaust gas by means of the filter with catalyst, within the low and intermediate temperature range (on the order of 300° C. to 600° C). On the other hand, PM is oxidized by $O_2$ (oxygen) in the exhaust gas, within the high temperature range (equal or higher than the order of 600° C.) which is higher than the temperature where PM is burned with $O_2$ in the exhaust gas.

In this continuous regeneration-type DPF device of filter with catalyst, the oxidation catalyst is also installed on the upstream side. This oxide catalyst raises the exhaust gas temperature at the rear PM filter inlet, through oxidation reaction of unburned HC and CO in the exhaust gas, and stimulates oxidation and removal of PM. At the same time, this oxidation reaction prevents the emission of unburned HC and CO into the atmosphere.

Howsoever, these continuous regeneration-type DPF devices also cause the problem of exhaust pressure rise by the clogging of this filter. When the exhaust gas temperature is equal or higher than about 350° C., PM collected by this filter (DPF) is burned continuously and cleaned, and the filter regenerates itself. However, in the case of low exhaust gas temperature and in an operating condition of an internal combustion engine where the emission of NO is low, for example, in the case where the low exhaust gas temperature state such as idling operation of internal combustion engine, low load/low speed operation continues, the oxidation reaction is not stimulated as the exhaust gas temperature is low, the catalyst temperature lowers and the catalyst is not activated and, moreover, NO lacks. Consequently, the aforementioned reaction does not occur and the filter can not be regenerated through oxidation of PM. As a result, PM continues to be accumulated in the filter and the filter clogging progresses.

As a measure against this filter clogging, it has been conceived to forcibly burn and remove the collected PM by forcibly raising the exhaust gas temperature, when the amount of clogging has exceeded a predetermined amount. As for means for detecting the filter clogging, there are some methods such as a method for detecting by the differential pressure before and behind the filter, and a method for detecting through determination of the PM accumulation quantity by calculating in accordance of a map data in which the PM quantity to be collected is previously set based on the engine operation state. Besides, as means for exhaust gas temperature raising, there is a method by injection control of the injection in the cylinder, or a method by fuel control in the direct fuel injection in the exhaust pipe.

The cylinder injection control executes a multi injection (multi-stage injection) to raise the exhaust gas temperature in the case where the exhaust gas temperature is lower than the active temperature of an oxidation catalyst disposed upstream of the filter or supported on the filter. When the exhaust gas temperature is higher than the active temperature, a post injection (posterior injection) is executed and then the fuel in the exhaust gas is burned through the oxidation catalyst. This burning raises the exhaust gas temperature equal to or higher than a temperature at which the PM collected in the filter can be burned. As a result the filter is regenerated through burning and removing the collected PM.

Normally with continuous regeneration-type DPF devices, when the accumulated quantity of PM reaches a preset PM accumulation limit value, the operation condition of the internal combustion engine is automatically changed to forced regeneration mode. In this forced regeneration mode operation, the exhaust gas temperature is forcibly raised and the quantity of NOx is increased. And thereby, the collected PM is oxidized and removed from the filter to regenerate the filter.

Furthermore, for example, Japanese patent application Kokai publication No. 2003-155914 and Japanese patent application Kokai publication No. 2003-155916 propose to install, in the vicinity of the driver's seat, an operating means for arbitrarily actuating a forced regeneration control means so that when a large quantity of PM has accumulated in the DPF by some reasons, the driver can intentionally and immediately carry out the forced regeneration of the particulate filter. More specifically, this operating means is comprised of a warning light that indicates excessive collecting condition and a regeneration button so that the forced regeneration control can be arbitrarily actuated. Furthermore, it is also proposed to indicate a warning to carry out a human-initiated forced regeneration in which the collected PM are forcibly burned and removed when it is determined that the particulate filter has become clogged upon a confirmation of an abnormal increase in back pressure based on the differential pressure before and behind the particulate filter.

Moreover, for instance, as shown in Japanese patent application Kokai publication No. 2003-3829, an exhaust gas purification device of internal combustion engine, wherein the collected PM quantity is compared with a first predetermined quantity and a second predetermined quantity, the exhaust gas is heated for a predetermined time and regeneration acceleration through intake/exhaust throttling is executed for accelerating the oxidation removal of PM when it is more than the first predetermined quantity and less than the second predetermined quantity, forced regeneration through post-injection for forcibly burning and removing PM is executed when it is more than the second predetermined quantity, and, when the collected PM quantity is still more than the first predetermined quantity after the predetermined time, has been proposed.

Moreover, for instance, as shown in Japanese patent application Kokai publication No. 2003-3833, a regeneration control method of continuous regeneration-type DPF device for removing PM efficiently, by determining the DPF clogging state by classifying it into 3 or more clogging levels, and performing a predetermined regeneration mode operation set in correspondence to this attained clogging level when the filter clogging state attains a predetermined clogging level, has been proposed.

However, if the forced regeneration processing is executed during the traveling of a vehicle, as the engine speed is higher than that of the idling regeneration, the post-injection quantity increases necessarily, making the post-injection control during the transition phase difficult. In short, it is difficult to avoid useless injections (useless shot) such as persistent post-injection when the load changes and the engine temperature rises in the transition state, or deceleration before the exhaust gas temperature rises even if the post-injection is executed. As a result, oil dilution, which is a dilution of oil with fuel, becomes frequent. Consequently, it is not preferable that the forced regeneration processing be executed frequently. On the other hand, it has been found that it is not the case for the forced regeneration control in the idling in the vehicle stop state, and oil dilution is relatively few. Therefore, it can be conceived not to perform the forced regeneration control while the vehicle is traveling, but to perform the forced regeneration control after having stopped the vehicle.

As one of them, a method for informing the driver of the necessity of forced regeneration by means of lamp or the like when the filter is clogged to a predetermined quantity, and regenerating the filter through the execution of the forced regeneration control, by operating a manual regeneration switch provided at the driver's seat after this informed driver has stopped the vehicle, can be devised.

In order to solve the problem of oil dilution, the forced regeneration is executed by raising the exhaust gas temperature through execution of a post-injection in the cylinder of an injection quantity lower than the load in a vehicle traveling state, when the operation conditions, such as idling during this stopping, are stable. Thereby, oil dilution is limited less than the case of regeneration control in the vehicle traveling state. It should be appreciated that, if left, this oil dilution provokes problems such as abrasion or seizure of a slide portion of the engine, so the resolution thereof is important.

However, on the other hand, a vehicle has various traveling patterns and, for instance, the vehicle traveling often on a speedway has many chances to be driven at a high speed high load and the self-regeneration is accelerated without requiring the forced regeneration control as the exhaust gas temperature is high. Consequently, there is a problem that PM (collected matter) does not accumulate at the center of the filter (DPF), but is biased to accumulate outside circumferentially, causing its clogging. In short, a clogging condition which is not indicated by the differential pressure appears. If this PM biased accumulation exists, this partially accumulated PM burns almost simultaneously and the combustion enlarges suddenly, when the PM burning starts, during the forced regeneration to be executed after this biased accumulation. This enlargement causes fusion damage due to the thermal runaway producing a high temperature state in the filter. Therefore, it is also necessary to prevent this damage.

Hence, concerning the oil dilution, it has been devised to perform the forced regeneration through the execution of multi-injection and/or post-injection in the case of low exhaust gas temperature, even during the traveling, when the travel distance has exceeded a predetermined quantity, along with the forced regeneration by a manual switch, based on a finding that fuel mixed into the oil evaporates when a considerable travel distance is attained, reducing the problem of oil dilution.

However, if this method is adopted, manual regeneration will be required often, in the case of a vehicle or the like having many patterns of traveling in a low speed, high load operation state. Consequently, the interval of asking the driver to press the manual regeneration switch becomes shorter, and the lamp prompting the manual regeneration lights up more frequently. As a result, there is a problem that the driver will feel it troublesome.

SUMMARY OF THE INVENTION

The object of the present invention is to provide a control method of exhaust gas purification system and the exhaust gas purification system which are capable of reducing remarkably the frequency of forced regeneration by the operation of a manual regeneration switch and improving the operability for the driver, in an exhaust gas purification system for prompting the driver to stop the vehicle and execute the forced regeneration by operating a manual regeneration switch through a warning such as flashing of an indicator, in the case of detecting that the detected collecting quantity is higher than a predetermined judgment collecting quantity, concerning the regeneration of a continuous regeneration-type DPF device.

The control method of an exhaust gas purification system of the present invention to achieve the aforementioned object, in an internal combustion engine mounted on a vehicle provided with a continuous regeneration diesel particulate filter in the exhaust gas passage thereof, having a diesel particulate filter control means including;

a collecting quantity detection means for detecting the collecting quantity of collected matters in the continuous regeneration diesel particulate filter, a forced regeneration control means for performing multi-injection and/or post-injection in the control of fuel injection into cylinder for raising exhaust gas temperature, burning forcibly the collected matters and thereby regenerating the continuous regeneration-type diesel particulate filter; and a warning means for urging a warning for prompting a driver to actuate the forced regeneration control means, in a case of detecting that the collecting quantity detected by the collecting quantity detection means is higher than a predetermined judgment collecting quantity.

the diesel particulate filter control means performing an exhaust gas temperature raising control by multi-injection in the control of fuel injection into cylinder in a case where the collecting quantity detected by collecting quantity detection means exceeds a predetermined first temperature rising judgment collecting quantity lower than a predetermined judgment collecting quantity and, thereafter, stopping the exhaust gas temperature raising control by multi-injection in the control of fuel injection into cylinder in a case where the collecting quantity detected by the collecting quantity detection means becomes lower than a predetermined second temperature rising judgment collecting quantity lower than the predetermined first temperature rising judgment collecting quantity.

Moreover, the exhaust gas purification system of the present invention to achieve the aforementioned object, in an internal combustion engine mounted on a vehicle provided with a continuous regeneration diesel particulate filter in the exhaust gas passage thereof; having a diesel particulate filter control means including;

a collecting quantity detection means for detecting the collecting quantity of collected matters in the continuous regeneration-type diesel particulate filter, a forced regeneration control means for performing multi-injection and/or post-injection in the control of fuel injection into cylinder for raising exhaust gas temperature, burning forcibly collected matters and thereby regenerating the continuous regeneration-type diesel particulate filter; and a warning means for urging a warning for prompting a driver to actuate the forced regeneration control means, in a case of detecting that the collecting quantity detected by the collecting quantity detection means is higher than a predetermined judgment collecting quantity, wherein;

the diesel particulate filter control means comprises an exhaust gas temperature raising control means for performing an exhaust gas temperature raising control by multi-injection in the control of fuel injection into cylinder in a case where the collecting quantity detected by the collecting quantity detection means exceeds a predetermined first temperature rising judgment collecting quantity lower than a predetermined judgment collecting quantity and, thereafter, for stopping the exhaust gas temperature raising control by multi-injection in the control of fuel injection into cylinder in a case where the collecting quantity detected by the collecting quantity detection means becomes lower than a predetermined second temperature rising judgment collecting quantity lower than the predetermined first temperature rising judgment collecting quantity.

Moreover, in the aforementioned exhaust gas purification system, the diesel particulate filter control means comprises a travel distance detection means for detecting a travel distance of the vehicle and, at the same time, is composed not to urge by the warning means, in a case where it is judged that the travel distance after the collection starts detected by the travel distance detection means has not attained a predetermined judgment travel distance, even if it is detected that the collecting quantity detected by the collecting quantity detection means is larger than the predetermined judgment collecting quantity.

Moreover, in the aforementioned exhaust gas purification system, the diesel particulate filter control means is composed to prohibit the operation of the forced regeneration control means by the driver, in the case where it is judged that the travel distance after the collection starts detected by the travel distance detection means has not attained a predetermined judgment travel distance, even if it is detected that the collecting quantity detected by the collecting quantity detection means is larger than the predetermined judgment collecting quantity.

According to the aforementioned composition, PM is incinerated for some degree through acceleration of PM burning, namely, regeneration of a DPF, by performing a multi-injection whose injection quantity is lower than that of the post-injection and raising the exhaust gas temperature little by little, in the case where the collecting quantity exceeds a threshold of a first temperature rising judgment collecting quantity, by setting this threshold before a predetermined judgment collecting quantity where the PM collecting quantity to the DPF alerts the manual regeneration request, namely, flashes an indicator for prompting to press a manual regeneration switch, for the purpose of allowing users having many traveling patterns that will increase the frequency of forced regeneration by the operation of the manual regeneration switch to drive the vehicle to such a travel distance that evaporates oil dilution and enables the forced regeneration during the traveling. Besides, the multi-injection is stopped when the collecting quantity lowers to a predetermined level, because the fuel consumption deteriorates, if the multi-injection is sustained in this state. It should be appreciated that this exhaust gas temperature raising control by multi-injection accelerates PM removal, being executed also during the vehicle stopping.

And, this exhaust gas temperature raising control by multi-injection is executed to the extent that the travel distance does not provoke problems by oil dilution in the case of performing the manual forced regeneration and, at the same time, within a range not to perform the forced regeneration automatically.

Continuous regeneration-type DPF devices in the aforementioned exhaust gas purification system include a continuous regeneration-type DPF device wherein an oxidation catalyst is supported by the filter, a continuous regeneration-type DPF device wherein an oxidation catalyst is installed upstream the filter, a continuous regeneration-type DPF device wherein an oxidation catalyst is supported by the filter and, at the same time, an oxidation catalyst is installed-upstream the filter, and so on.

In terms of regeneration of the continuous regeneration-type DPF device and in accordance with the control method for an exhaust gas purification system and the exhaust gas purification system according to the present invention, the driver is urged through the flashing of an indicator lamp etc. to stop the vehicle and through the operation of a manual switch to perform forced regeneration when the collecting quantity of collected matters is detected as being larger than the predetermined judgment collecting quantity. In the exhaust gas purification system, from the point at which the collecting quantity of collected matters has exceeded a predetermined first temperature rising judgment collecting quantity set lower than a predetermined judgment collecting quantity to the point at which the collecting quantity thereof becomes less than a predetermined second temperature rising judgment collecting quantity set lower than the first temperature rising judgment collecting quantity, exhaust gas temperature raising control is performed by multi injection in a fuel injection control into cylinder. Owing to the multi-injection of which injection volume is lower than that of the post-injection, the exhaust gas temperature is raised little by little. As a result of this temperature raising, the PM is burned, promoting regeneration of the DPF.

Consequently, the frequency of the manual regeneration required when the collecting quantity of collected matters reaches the predetermined judgment collecting quantity, can be reduced. For this reason, the frequency of the manual regeneration caused by switching operation can be drastically reduced and the driver's ease of operation can be increased.

DETAILED DESCRIPTION OF THE PREFERRED EMBODIMENT

Hereinafter, the preferred embodiments of the control method for an exhaust gas purification system and the exhaust gas purification system according to the present invention will be described with reference to the accompanying drawings. The following explanation will use the example of an exhaust gas purification system provided with a continuous regeneration-type diesel particulate filter (DPF) device comprising a combination of an oxidation catalyst and a filter with catalyst.

[Configuration of Exhaust Gas Purifying System]

Figure 1:
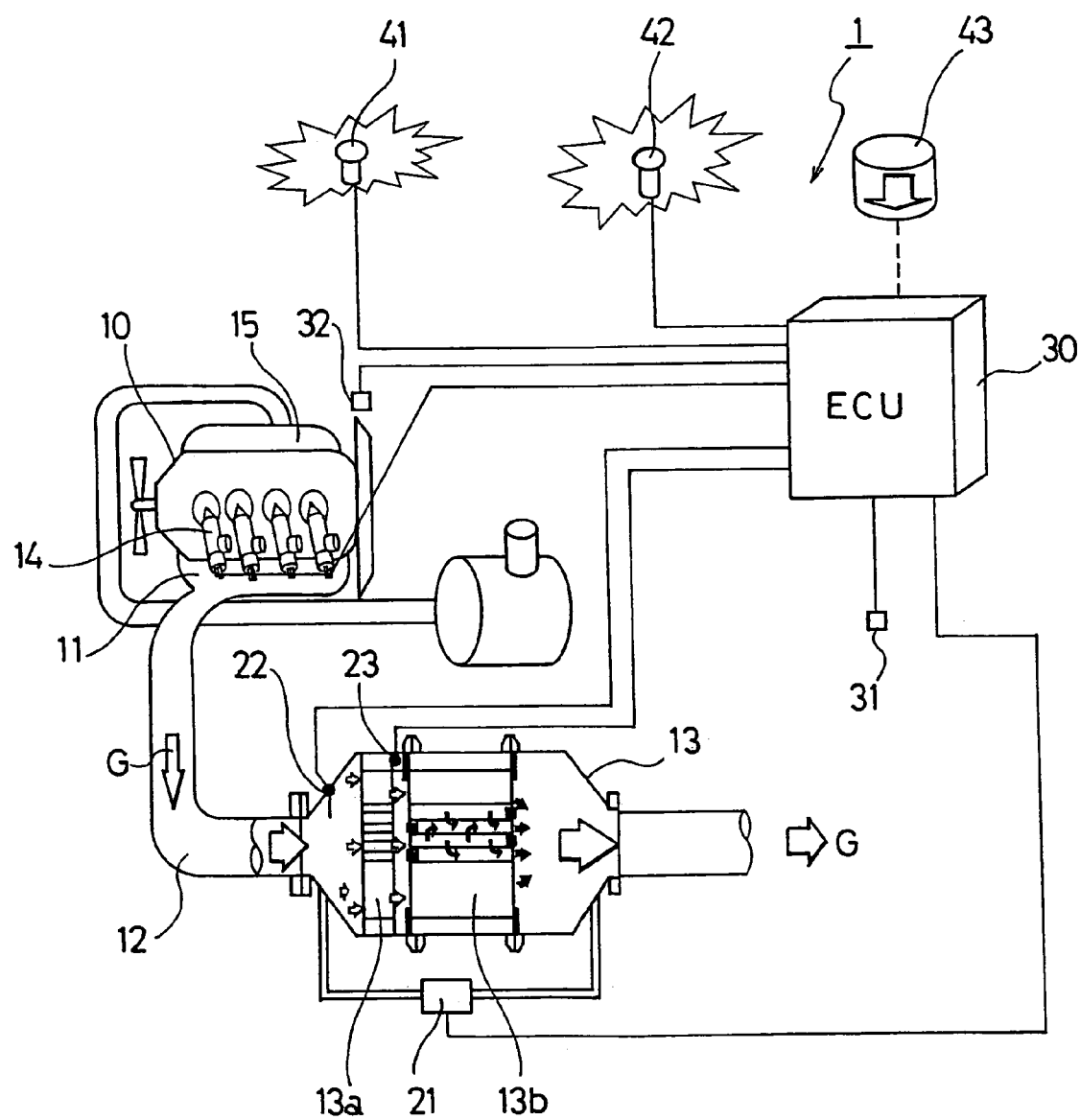
FIG. 1 is a systematic block diagram of the exhaust gas purification system according to an embodiment of the present invention.

FIG. 1 shows the configuration of an exhaust gas purification system 1 for an internal combustion engine according to an embodiment of the present invention. This exhaust gas purification system 1 is configured to provide a continuous regeneration-type DPF 13 on an exhaust passage 12 connected to an exhaust manifold 11 of a diesel engine 10. This continuous regeneration-type DPF 13 is configured with an oxidation catalyst 13a on the upstream side thereof and a filter with catalyst 13b on the downstream side thereof.

The oxidation catalyst 13a is formed so as to support an oxidation catalyst of platinum (Pt) etc. on a support with a ceramic honeycomb structure etc. The filter with catalyst 13b is formed of a monolithic honeycomb type, wall flow type filter with entrances and exits to channels in a porous ceramic honeycomb alternately closed or a felt-type filter with randomly layered alumina other inorganic fibers or the like etc. The catalyst of platinum or cerium oxide etc. is supported on this filter portion.

In the cases where a monolithic honeycomb type, wall flow type filter is used as the filter with catalyst 13b, the particulate matter (PM) contained in the exhaust gas is collected (trapped) in the porous ceramic walls. When a fabric type filter type is used, PM is collected in the inorganic fibers thereof.

A differential pressure sensor 21 is provided on the conduit tube in front of and behind the continuous regeneration-type DPF 13 in order to estimate the collecting quantity of PM on the filter with catalyst 13b. For the purpose of regeneration control for the filter with catalyst 13b, furthermore, an oxidation catalyst inlet exhaust gas temperature sensor 22 and a filter inlet exhaust gas temperature sensor 23 are provided upstream of and between the oxidation catalyst 13a and the filter with catalyst 13b respectively.

The output values from these sensors are input to an engine control unit (ECU) 30. In addition to controlling the overall operation of the engine 10, the engine control unit 30 also performs regeneration control for the continuous regeneration-type DPF 13. The fuel injection devices (i.e., injection nozzles) 14 of the engine 10 are controlled in accordance with the control signals output from this engine control unit 30. Furthermore, wherever necessary, the intake throttle valve (not shown) adjusting the intake quantity into the intake manifold 15 and the EGR valve adjusting the EGR volume are also controlled by the control signals output from this ECU 30. The EGR valve is provided together with the EGR cooler on the EGR passage (not shown) etc.

These fuel injection devices 14 are connected to a common-rail fuel injection system (not shown) storing temporarily the fuel pressurized to high pressure by the fuel pump (not shown). In order to operate the engine, the accelerator opening from the accelerator position sensor (APS) 31 and the engine speed from the engine speed sensor 32 etc. are input into the engine control unit 30 together with other data such as the vehicle speed and cooling water temperature, etc.

[Configuration of Control Means]

Figure 2:
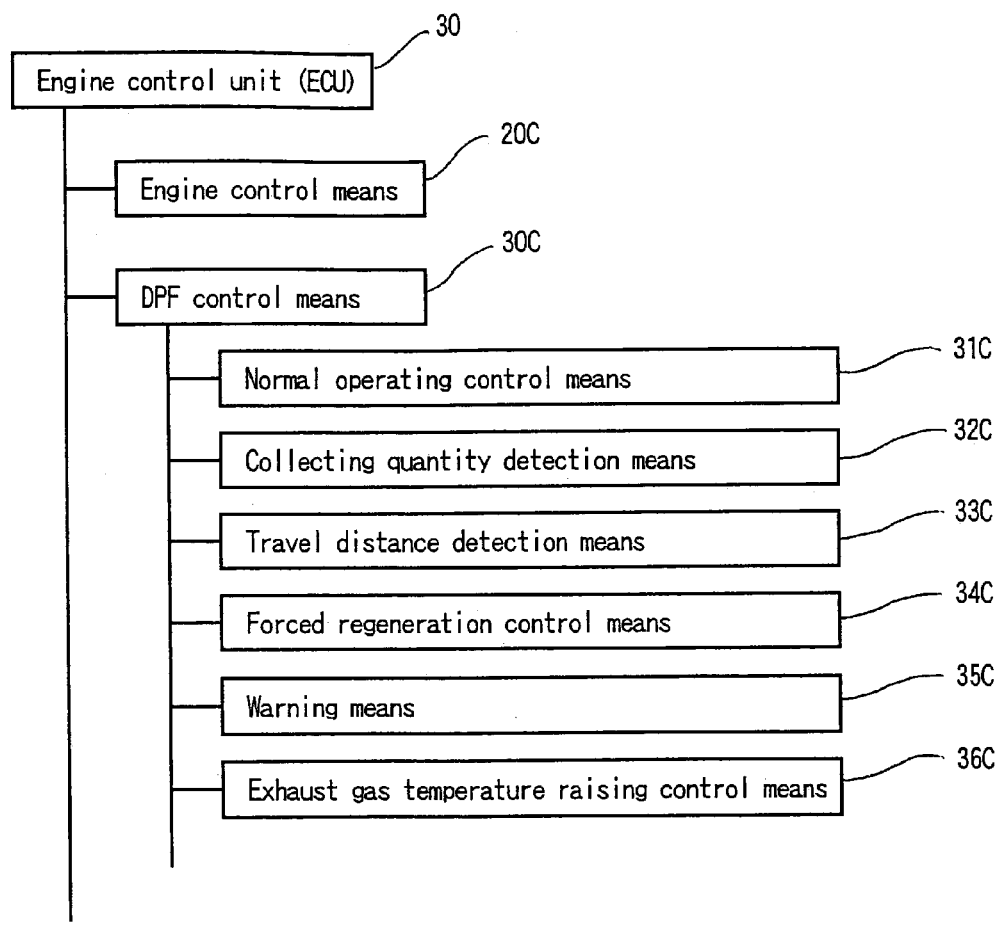
FIG. 2 is a drawing showing the control means configuration for the exhaust gas purification system according to an embodiment of the present invention.

As shown in FIG. 2, the engine control device 30 according to the present invention comprises an engine control means 20C controlling driving of the engine and a DPF control means 30C for the exhaust gas purification system 1, etc. The DPF control means 30C comprises a normal operating control means 31C, a collecting quantity detection means 32C, a travel distance detection means 33C, a forced regeneration control means 34C, a warning means 35C, an exhaust gas temperature raising control means 36C, etc.

The normal operating control means 31C is in particular a means for performing normal operation unrelated to regeneration of the continuous regeneration-type DPF device 13. In the normal operating control means 31C the normal injection control is carried out wherein a predetermined volume of fuel is injected from the fuel injection devices 14 in accordance with an electric current time signal calculated in the control device 30 based on signals from the accelerator position sensor 31 and signals from the engine speed sensor 32.

The collecting quantity detection means 32C is a means for detecting the collecting quantity ΔPm of collected matters accumulated in the filter with catalyst 13b of the continuous regeneration-type DPF 13. In the collecting quantity detection means 32C, detection of this collecting quantity ΔPm is carried out using the cumulative calculated value of the collecting quantity estimated from the engine speed and load, the engine rotating accumulated time, and the differential pressure before and after the continuous regeneration-type DPF device 13, etc. In this embodiment, detection thereof is carried out based on the differential pressure before and after the continuous regeneration-type DPF device 13—that is, the measurement values from the differential pressure sensor 21.

The travel distance detection means 33C is a means for detecting the travel distance ΔMc traveled by the vehicle after DPF regeneration. Whenever forced regeneration is carried out, this distance ΔMc is reset at a suitable timing from the start of regeneration to the end thereof.

Although varying slightly in accordance with the type of the continuous regeneration-type DPF device 13, the forced regeneration control means 34C performs multi injection (multi-stage injection) in a fuel injection into cylinder of the engine 10, raising the exhaust gas temperature to the active temperature of the oxidation catalyst 13a, thereafter performing post injection (posterior injection) to raise the filter inlet exhaust gas temperature detected by the filter inlet exhaust gas temperature sensor 23, thereby realizing a suitable temperature and environment for PM oxidation and removal. Then, the PM accumulated on the filter with catalyst 13b is forcibly burned and removed, and the filter with catalyst 13b is forcibly regenerated. Furthermore, it is also possible to use intake control such as intake throttle and EGR etc. in combination.

The warning means 35C comprises a flashing lamp (or DPF lamp) 41 and a warning lamp 42, etc. This warning means 35C is a means for urging the driver through flashing of the flashing lamp 41 to manually actuate the forced regeneration control means 34C, and through the lighting of the warning lamp 42, to bring the vehicle to a service center. Furthermore, upon receiving of this warning, the driver is capable of actuating the forced regeneration control means 34C through a manual operation of a regeneration switch 43.

And, in the present invention, an exhaust gas temperature raising control means 36C is provided. This exhaust gas temperature raising control means 36C is composed to perform the exhaust gas temperature raising control by multi-injection in the control of fuel injection into cylinder, in the case where the collecting quantity $\Delta Pm$ detected by a collecting quantity detection means 32C exceeds a predetermined first temperature rising judgment collecting quantity $\Delta P01$ which is lower than a predetermined judgment collecting quantity $\Delta P1$ and, thereafter, to stop the exhaust gas temperature raising control by multi injection, in the case where the collecting quantity $\Delta Pm$ detected by a collecting quantity detection means 32C becomes lower than a predetermined second temperature rising judgment collecting quantity $\Delta P02$ which is lower than the predetermined first temperature rising judgment collecting quantity $\Delta P01$.

The DPF control means 30C having these various means is composed as means for sustaining the normal operation by the normal operating control means 31C, urging a warning for prompting the driver to manually actuate the forced regeneration control means 34C, actuating the forced regeneration control means 34C automatically and, at the same time, performing the exhaust gas temperature raising through multi injection by the exhaust gas temperature raising control means 36C, based on the collecting quantity $\Delta Pm$ detected by the collecting quantity detection means 32C and the travel distance $\Delta Mc$ after the DPF regeneration detected by the travel distance detection means 33C.

[Regeneration Control]

Hereinafter, a regeneration control by the exhaust gas purification system 1 will be explained. During the course of control by the exhaust gas purification system 1, normal operation is performed by the normal operating control means 31C and PM is collected. At suitable time intervals during this normal operation, control is carried out in accordance with the regeneration control flow shown in FIG. 3. Specifically, it is judged whether or not the collecting quantity $\Delta Pm$ detected by the collecting quantity detection means 31C and the travel distance $\Delta Mc$ detected by the travel distance detection means 32C are within a predetermined range, whether manual regeneration is possible, and whether automatic traveling regeneration is possible. Furthermore, whenever so required, following the execution of various processes, it returns to normal operation as controlled by the normal operating control means 31C. Driving of the vehicle continues as normal operation and regeneration control are repeated.

Figure 5:
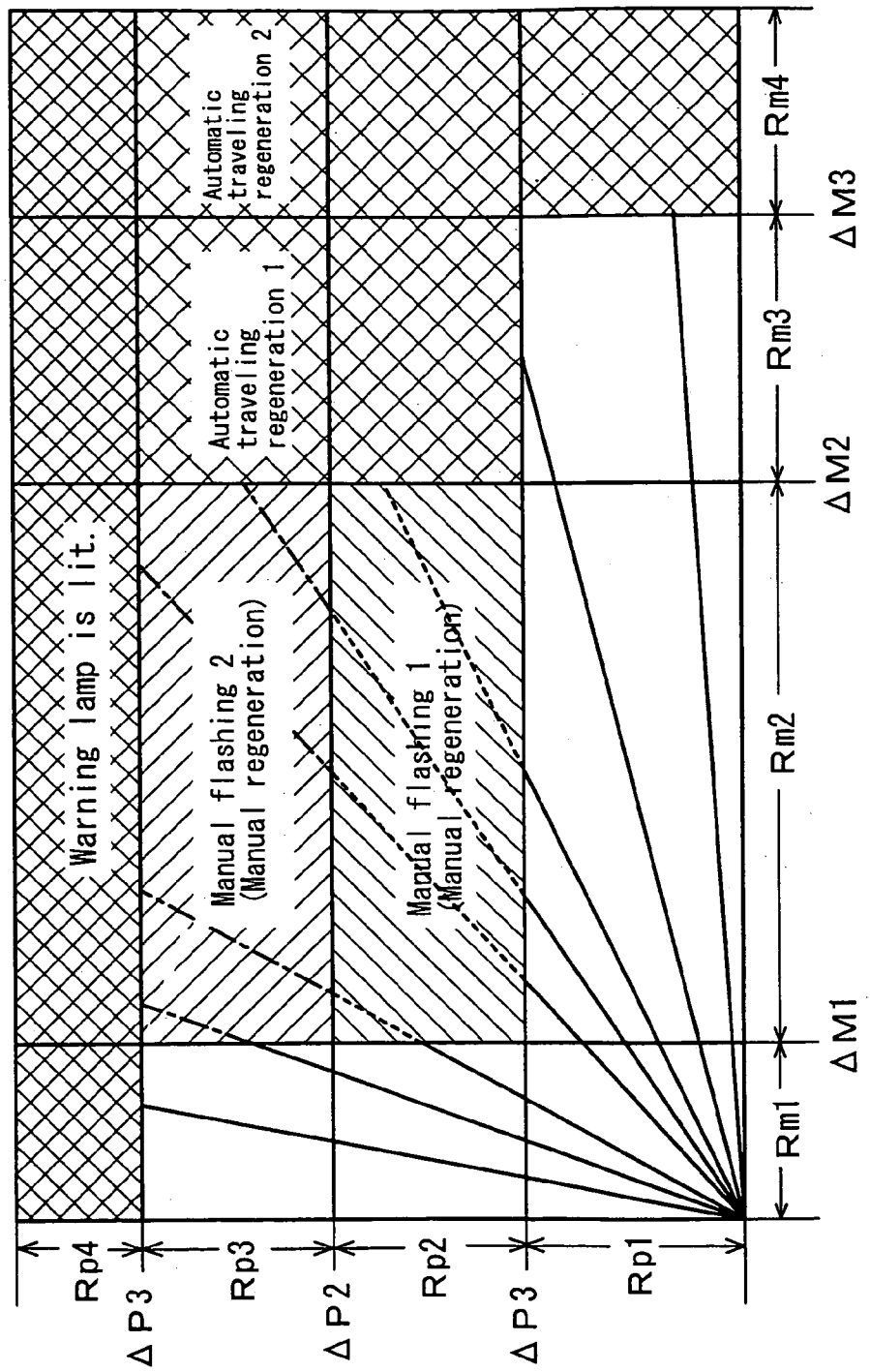
FIG. 5 is a drawing showing in a schematic manner the regeneration control map of the exhaust gas purification system of an embodiment of the present invention.

The regeneration control flow of FIG. 3 will be described with reference to the regeneration control map of FIG. 5. Specifically, the control used to judge whether forced regeneration is required is shown in FIG. 5.

[Regeneration Control Map]

First of all, the regeneration control map of FIG. 5 will be explained. In the regeneration control map presented in a schematic fashion in FIG. 5, the vertical axis shows the collecting quantity $\Delta P$ of PM (or as relevant to this embodiment, the differential pressure). Using three thresholds—namely, the first threshold $\Delta P1$ (a predetermined judgment collecting quantity), the second threshold $\Delta P2$, and the third threshold $\Delta P3$—the range of the collecting quantity $\Delta P$ is split into four different ranges—namely, the first collecting quantity range Rp1, the second collecting quantity range Rp2, the third collecting quantity range Rp3, and the fourth collecting quantity range Rp4. Furthermore, the horizontal axis thereof shows the travel distance $\Delta M$. Using three thresholds—namely, the first threshold $\Delta M1$ (a predetermined judgment travel distance), the second threshold $\Delta M2$, and the third threshold $\Delta M3$—the range of the travel distance $\Delta M$ is split into four different ranges—namely, the first travel distance range Rm1, the second travel distance range Rm2, the third travel distance range Rm3, and the fourth travel distance range Rm4. Then, in terms of the regeneration control it is judged in which range the present state belongs, and where necessary, the following processing is carried out. For $\Delta Pi$ and $\Delta Mi$, the number of the setting and factors of their setting may be arbitrarily set. One of the examples will be described here.

The first threshold $\Delta M1$ (a predetermined judgment travel distance) indicates the lower limit value at which oil dilution problems do not occur upon manual forced regeneration. The second threshold $\Delta M2$ indicates the lower limit value at which oil dilution problems do not occur upon automatic forced regeneration during traveling. The third threshold $\Delta M3$ indicates the value at which forced regeneration is carried out to prevent thermal runaway and DPF damage caused by uneven clogging of PM on the filter with catalyst 13b. Furthermore, the fourth travel distance range Rm4 is the range exceeding the third threshold $\Delta M3$. Automatic forced regeneration and automatic lighting of the warning lamp are carried out at this fourth travel distance range Rm4.

First of all, if forced regeneration is carried out manually when the detected travel distance $\Delta Mc$ is within the first travel distance range Rm1 and does not exceed the first threshold $\Delta M1$, insufficient evaporation of the fuel within the oil results in the problem of oil dilution. For this reason, manual forced regeneration is prohibited in such a case. Also in this case, the vehicle's traveling pattern can result in the collecting quantity per unit distance traveled being high and the detected collecting quantity $\Delta Pm$ exceeding the third threshold $\Delta P3$ and entering the fourth collecting quantity range Rp4. In such a condition, the PM accumulated on the continuous regeneration-type DPF 13 begins self-burning, and in order to prevent thermal runaway caused by sudden burning of PM, a state wherein both manual regeneration and automatic traveling regeneration are prohibited is adopted, and furthermore, the warning lamp 42 is lit to urge the driver to bring the vehicle to a service center.

Next, when the detected travel distance $\Delta Mc$ exceeds the first threshold $\Delta M1$ and enters the second travel distance range Rm2, the travel distance is insufficiently long and evaporation of the fuel mixed into the engine oil does not take place to a sufficient degree; accordingly, automatic forced regeneration is not carried out and a warning is issued to the driver to urge stopping of the vehicle and manual activation of forced regeneration. In this case, different warnings are issued based on the size of the detected collecting quantity $\Delta Pm$.

While the detected collecting quantity $\Delta Pm$ is smaller than the first threshold $\Delta P1$ (a predetermined judgment collecting quantity), clogging of the filter with catalyst 13b is light and actuation of the forced regeneration control means 34C is not required; accordingly, normal operation is continued as is. Furthermore, when the detected collecting quantity $\Delta Pm$ enters the second collecting quantity range Rp2 which exceeds the first threshold $\Delta P1$ (a predetermined judgment collecting quantity) but does not exceed the second threshold $\Delta P2$, automatic traveling regeneration is prohibited in order to prevent the problem of oil dilution during forced regeneration and the flashing lamp (DPF lamp) 41 is flashed slowly (i.e. manual flashing 1). This urges the driver to stop the vehicle and manually perform forced regeneration (manual regeneration).

Furthermore, when the detected collecting quantity $\Delta Pm$ enters the third collecting quantity range Rp3 which exceeds the second threshold $\Delta P2$ but does not exceed the third threshold $\Delta P3$, automatic traveling regeneration is prohibited in order to prevent the problem of oil dilution during forced regeneration and the flashing lamp 41 is flashed quickly (i.e., manual flashing 2). This strongly urges the driver to stop the vehicle and manually perform forced regeneration. When this third collecting quantity range Rp3 has been entered, certain operation conditions can result in the PM accumulated on the continuous regeneration-type DPF 13 beginning to self burn, and in such a case there is a high probability of thermal runaway as a result of sudden PM burning and damage by melting being done to the filter with catalyst 13b. Therefore, in addition to these operations, the fuel injection volume is reduced out of concern for the possibility of self-burn.

When the detected collecting quantity $\Delta Pm$ exceeds the third threshold $\Delta P3$ and enters the fourth accumulation range Rp4, neither manual regeneration nor automatic traveling regeneration are activated in order to prevent the thermal runaway. Then the warning lamp 42 is turned on to urge the driver to take the vehicle to a service center.

When the detected travel distance $\Delta Mc$ exceeds the second threshold $\Delta M2$ and enters the third travel distance range Rm3, evaporation of the fuel mixed into the engine oil is sufficient and it is possible to execute automatic forced regeneration (i.e., automatic traveling regeneration) during traveling. Accordingly, when the detected collecting quantity $\Delta Pm$ exceeds the first threshold $\Delta P1$ (a predetermined judgment collecting quantity) and enters the second travel distance range Rp2, automatic traveling regeneration is carried out during traveling to actuate the forced regeneration control means 34C automatically. In accordance with this automatic traveling regeneration, the driver is not burdened with the need to activate automatic regeneration, or in other words, to perform On/Off operating of the manual regeneration switch 43. While the detected collecting quantity $\Delta Pm$ is smaller than the first threshold $\Delta P1$ (a predetermined judgment collecting quantity), clogging of the filter with catalyst 13b is light and actuation of the forced regeneration control means 34C is not required. Accordingly, normal operation is continued as is.

When the detected travel distance $\Delta Mc$ exceeds the third threshold $\Delta M3$ and enters the fourth travel distance range Rm4, evaporation of the fuel mixed into the engine oil is sufficient and it is possible to execute automatic forced regeneration during traveling. For this reason, while the detected collecting quantity $\Delta Pm$ does not exceed the third threshold $\Delta P3$, automatic traveling regeneration is carried out without fail and irrespective of the detected collecting quantity $\Delta Pm$ in order to burn the unevenly accumulated PM. When the detected collecting quantity $\Delta Pm$ exceeds the third threshold $\Delta P3$ and enters the fourth accumulation range Rp4, a state wherein both manual regeneration and automatic traveling regeneration are prohibited to prevent thermal runaway is adopted, and in addition, the warning lamp 42 is turned on to urge the driver to take the vehicle to a service center.

[Regeneration Control Flow]

Figure 3:
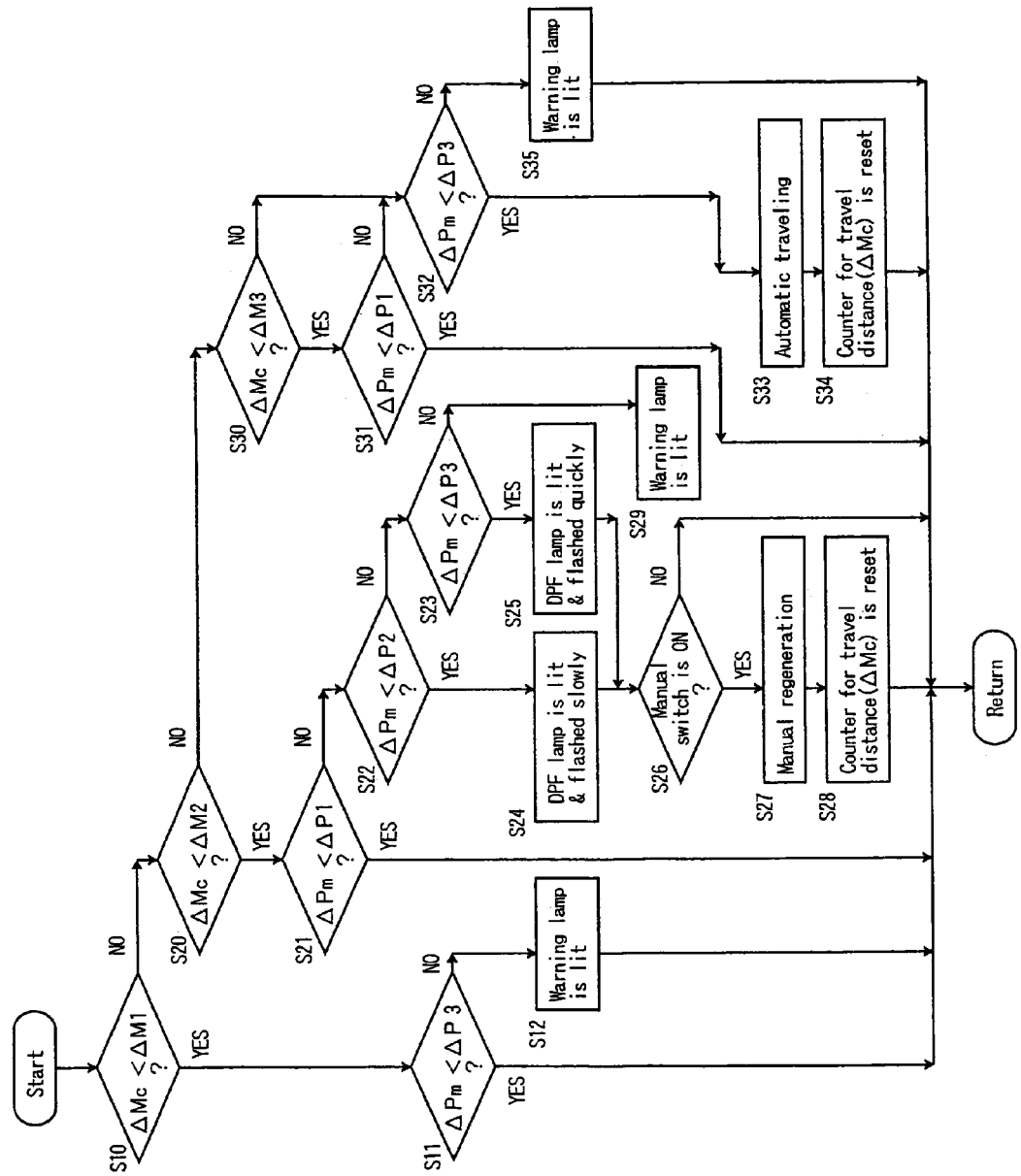
FIG. 3 is a drawing showing the regeneration control flow of the exhaust gas purification system according to an embodiment of the present invention.

The control illustrated in the regeneration control map of FIG. 5 is executed in accordance with the regeneration control flow of which an example is shown in FIG. 3. Upon commencement of the regeneration control flow of FIG. 3, it is judged in Step S10 whether or not the detected travel distance $\Delta Mc$ is in excess of the first threshold $\Delta M1$ (a predetermined judgment travel distance). If this judgment indicates that the threshold has not been exceeded and $\Delta Mc$ is in the first travel distance range Rm1, it is judged in Step S11 whether the detected collecting quantity $\Delta Pm$ is in excess of the third threshold $\Delta P3$. If this is not the case, control is returned and normal operation continues. Furthermore, if $\Delta Pm$ is in excess of $\Delta P3$, the warning lamp 42 is lit in Step S12 and control is returned.

Accordingly, if it is judged in Step S10 that the detected travel distance $\Delta Mc$ is in the first travel distance range Rm1, manual actuation of the forced regeneration control means 34C is prohibited. Furthermore, automatic actuation of the forced regeneration control means 34C through automatic traveling regeneration is also not carried out.

If in Step S10 it is judged that the detected travel distance $\Delta Mc$ is in excess of the first threshold $\Delta M1$ (a predetermined judgment driving distance), in Step S20 it is judged whether the travel distance $\Delta Mc$ is in excess of the second threshold $\Delta M2$. If this judgment indicates that the threshold has not been exceeded, it is judged in Step S21 whether the collecting quantity $\Delta Pm$ is in excess of the first threshold $\Delta P1$ (a predetermined judgment collecting quantity). If this is not the case, control is returned and normal operation continues.

If in Step S21 it is judged that the collecting quantity $\Delta Pm$ is in excess of the first threshold $\Delta P1$ (a predetermined judgment collecting quantity), in Step S22, it is judged whether the collecting quantity $\Delta Pm$ is in excess of the second threshold $\Delta P2$. If this is not the case, the flashing lamp (DPF lamp) 41 is flashed slowly in Step S24, and in Step S26, it is judged whether the manual regeneration switch is On or Off.

Furthermore, if it is judged in Step S22 that the collecting quantity $\Delta Pm$ is in excess of the second threshold $\Delta P2$, it is judged in Step S23 whether the collecting quantity $\Delta Pm$ is in excess of the third threshold $\Delta P3$. If this is not the case, the flashing lamp (DPF lamp) 41 is flashed quickly in Step S25, and in Step S26, it is judged whether the manual regeneration switch is On or Off.

If the manual regeneration switch 43 is turned On in Step S26, then as a result of this action, manual regeneration is carried out through actuation of the forced regeneration control means 34C. In Step S28, the counter for travel distance $\Delta Mc$ is reset and control is returned. Furthermore, if the collecting quantity $\Delta Pm$ is judged based on collecting quantity rather than differential pressure, the PM cumulative value is also reset. If the manual regeneration switch 43 does not turn On in Step S26, control is returned and switching On of the manual regeneration switch 43 by the driver is awaited during the repetition of this regeneration control flow.

If it is judged in Step S23 that the collecting quantity $\Delta Pm$ is in excess of the third threshold $\Delta P3$, a state wherein both manual regeneration and automatic traveling regeneration are prohibited is adopted, and in Step S29, the warning lamp 42 is lit on and control is returned.

Furthermore, if it is judged in Step S20 that the travel distance $\Delta Mc$ is in excess of the second threshold $\Delta M2$, it is judged in Step S30 whether the travel distance $\Delta Mc$ is in excess of the third threshold $\Delta M3$. If in Step S30 it is judged that this is the case, it is judged in Step S31 whether the collecting quantity $\Delta Pm$ is in excess of the first threshold $\Delta P1$ (a predetermined judgment collecting quantity). If the judgment of Step S31 judges that this is not the case, control is returned and normal operation continues. Furthermore, the judgment of Step S32 is carried out if in Step S31 it is judged that $\Delta Pm$ is in excess $\Delta P1$. The judgment of Step S32 is carried out if in Step S30 it is judged that $\Delta Mc$ is not in excess of the $\Delta M3$.

In Step S32, it is judged whether the collecting quantity $\Delta Pm$ is in excess of the third threshold $\Delta P3$. If this is the case, a state wherein both manual regeneration and automatic traveling regeneration are prohibited is adopted, and in Step S35, the warning lamp 42 is turned on and control is returned.

Furthermore, if it is judged in Step S32 that the collecting quantity $\Delta Pm$ is not in excess of the third threshold $\Delta P3$, automatic traveling regeneration is carried out during traveling at Step S33 to actuate the forced regeneration control means 34C automatically. In Step S34, the counter for travel distance $\Delta Mc$ is reset and control is returned. Furthermore, if the collecting quantity $\Delta Pm$ is judged based on PM cumulative value rather than differential pressure, the PM cumulative value is also reset.

In other words, in accordance with the regeneration control flow of FIG. 3, even when the collecting quantity $\Delta Pm$ detected by the collecting quantity detection means 32C is detected as exceeding a predetermined judgment collecting quantity $\Delta P1$ (first threshold), if the travel distance $\Delta Mc$ after the start of accumulation detected by the travel distance detection means 33C has not yet reached a predetermined judgment travel distance $\Delta M1$ (first threshold), no warning is issued using the warning means 35C, and control is carried out such that actuation of the forced regeneration control means 34C by the driver is prohibited.

Furthermore, if the travel distance $\Delta Mc$ after the start of accumulation detected by the travel distance detection means 33C has reached a predetermined judgment travel distance $\Delta M1$ (first threshold) but not reached the second threshold $\Delta M2$ and the collecting quantity $\Delta Pm$ detected by the collecting quantity detection means 32C is detected as exceeding a predetermined judgment collecting quantity $\Delta P1$ (first threshold), the flashing lamp (DPF lamp) 41 is slowly flashed and the driver is urged to manually operate the manual regeneration switch 43. When this flashing lamp 41 flashes, the driver must promptly stop the vehicle and manually activate forced regeneration using the manual regeneration switch 43. However, if this warning is ignored, PM will continue to accumulate on the filter with catalyst 13b, and when the detected collecting quantity $\Delta Pm$ exceeds a predetermined second threshold $\Delta P2$, the flashing lamp 41 is flashed quickly, providing a more explicit warning to the driver and strongly urging that manual regeneration be carried out.

[Regeneration Control Flow for Exhaust Gas Temperature Raising Control Means]

Figure 4:
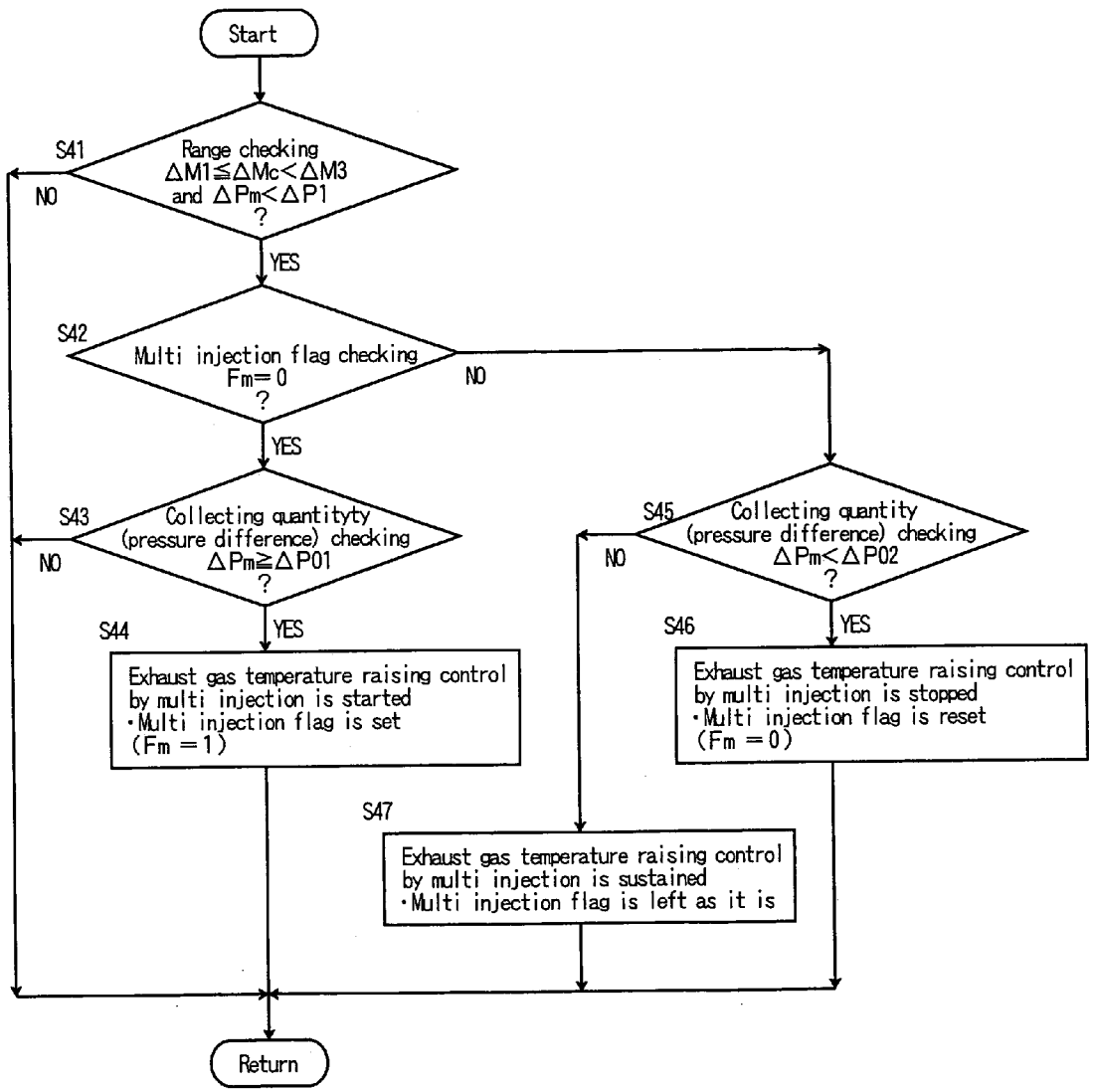
FIG. 4 is a drawing showing the control flow of the exhaust gas temperature raising control means according to the present invention.
Figure 6:
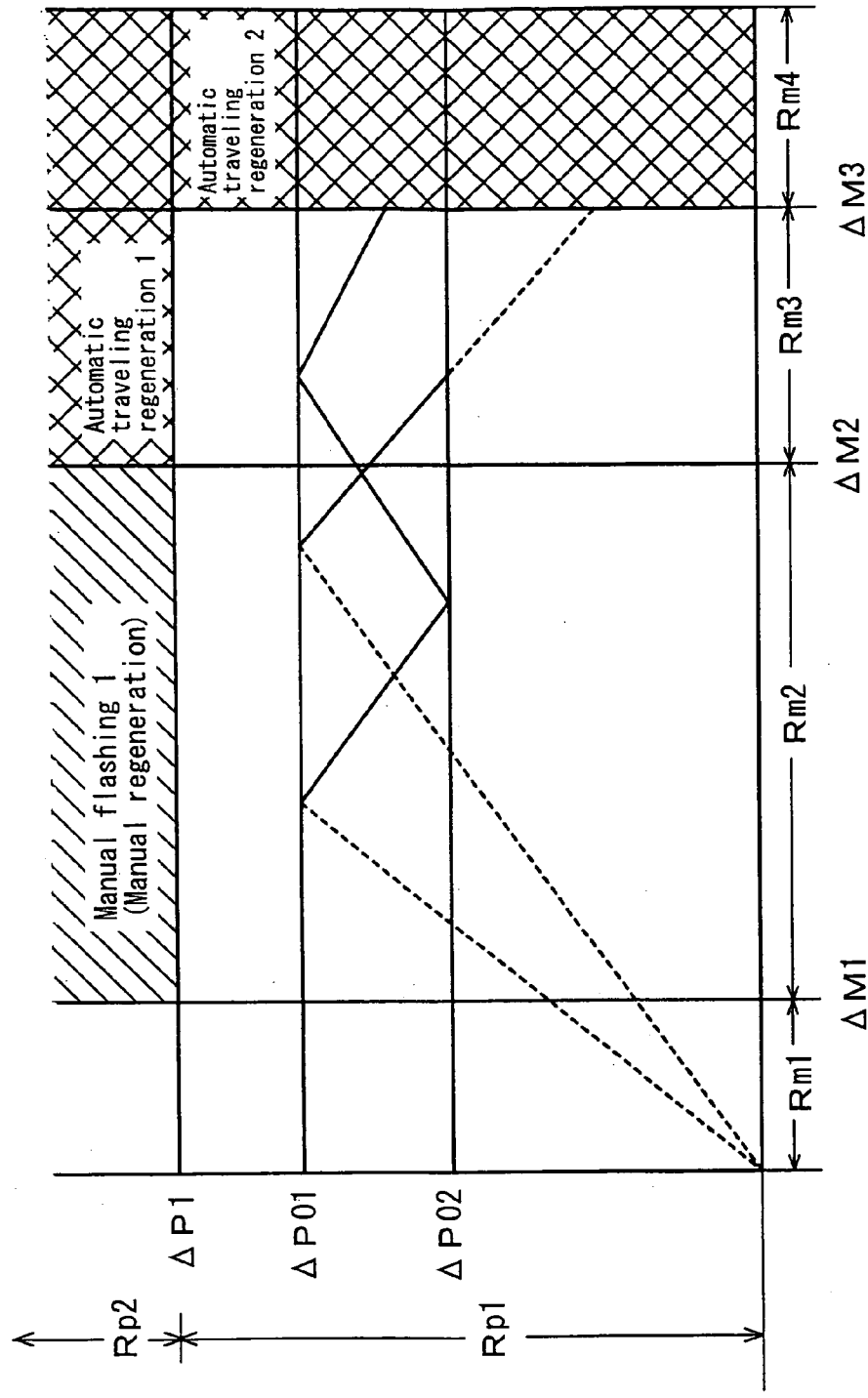
FIG. 6 is a drawing showing in a schematic manner the control map of the exhaust gas temperature raising control means according to the present invention.

In addition to the above-described DPF regeneration control and in accordance with the control flow of FIG. 4, the present invention discloses exhaust gas temperature raising control by the exhaust gas temperature raising control means 36C. Furthermore, FIG. 6 shows an example of a control map according to the control flow of FIG. 4.

The control flow of FIG. 4 is a control flow called and executed before the control flow of FIG. 3 is called and executed, and when started, range checking is carried out in Step S41. In this range check, it is judged whether the travel distance $\Delta Mc$ is in excess of the first threshold $\Delta M1$ and not in excess of the third threshold $\Delta M3$, and also whether the collecting quantity $\Delta Pm$ is less than the first threshold $\Delta P1$. If this condition is not satisfied, control is returned without carrying out exhaust gas temperature raising control.

In other words, exhaust gas temperature raising control is performed in this control flow only when the travel distance is in the second travel distance range Rm2 or the third travel distance range Rm3, and in addition, the collecting quantity range is in the first collecting quantity range Rp1. In the case of all other ranges, exhaust gas temperature raising control is not carried out in this control flow.

If the condition of Step S41 is satisfied, it is judged in Step S42 whether exhaust gas temperature raising control through multi injection is being carried out at the corresponding point in time based on the multi injection flag Fm being 0 (zero, flag off) or 1 (one, flag on). If in this judgment the multi injection flag Fm is 0, it is judged that exhaust gas temperature raising control through multi injection is not being carried out, and control proceeds to Step S43. If in this judgment the multi injection flag Fm is 1, it is judged that exhaust gas temperature raising control through multi injection is being carried out, and control proceeds to Step S45.

In Step S43, it is judged whether the collecting quantity $\Delta Pm$ (i.e., differential pressure) equal to or greater than—that is, in excess of—a fourth threshold $\Delta P01$ (a predetermined first temperature rising judgment collecting quantity) set lower than the first threshold (a predetermined judgment collecting quantity) $\Delta P1$. If this is not the case, control returns without performing exhaust gas temperature raising control; alternatively, if $\Delta Pm$ is in excess of $\Delta P01$, control proceeds to Step S44 and the exhaust gas temperature raising control is started by multi injection in a control of fuel injection into cylinder, then the multi injection flag is set (i.e., Fm=1), and control is returned.

In Step S45, it is judged whether the collecting quantity $\Delta Pm$ (i.e., differential pressure) is less than a fifth threshold $\Delta P02$ (a predetermined second temperature rising judgment collecting quantity) set lower than the fourth threshold $\Delta P01$. If this is the case, exhaust gas temperature raising control through multi injection is stopped in Step S46, and in addition the multi injection flag is reset (i.e., Fm=0) and control is returned.

Furthermore, if $\Delta Pm$ is detected as being not less than $\Delta P02$ in Step S45, control proceeds to Step S47, the exhaust gas temperature raising control through multi injection is continued and is carried out over the predetermined period of time corresponding to the check interval for collecting quantity, and control is subsequently returned. At this time, the multi injection flag (Fm=1) is not changed, namely it is left as it is.

When the control flow of FIG. 4 is completed and control is returned, the control flow of FIG. 3 is executed. Upon any transition between the driving distance ranges Rm1, Rm2, Rm3, and Rm4 and the collecting quantity ranges Rp1, Rp2, Rp3, and Rp4 occurs, the corresponding control is carried out. Furthermore, if no such range transition occurs, the control flow of FIG. 4 is restarted. In this way, the control flow of FIG. 4 and the control flow of FIG. 3 are repeated in sequence.

In accordance with the above-described control, when the collecting quantity $\Delta Pm$ (differential pressure) detected by the collecting quantity detection means 32C exceeds a predetermined first temperature rising judgment collecting quantity $\Delta P01$ (fourth threshold) set lower than a predetermined judgment collecting quantity $\Delta P1$ (first threshold), exhaust gas temperature raising control through multi injection is executed, and following this, when the collecting quantity ΔPm becomes lower than a predetermined second temperature rising judgment collecting quantity ΔP02 (fifth threshold) set lower than the first temperature rising judgment collecting quantity ΔP01 (fourth threshold), control is performed such that exhaust gas temperature raising through multi injection is stopped.

In other words, from the point at which the collecting quantity ΔPm exceeds the predetermined first temperature rising judgment collecting quantity ΔP01 to the point at which the collecting quantity ΔPm becomes lower than the predetermined second temperature rising judgment collecting quantity ΔP02, exhaust gas temperature raising control through multi injection is carried out; accordingly, the temperature of the exhaust gas is raised little by little, PM is burned, and regeneration of the DPF is advanced.

Accordingly, the frequency with which the collecting quantity ΔPm reaches the predetermined judgment collecting quantity ΔP1 requiring manual regeneration reduces, and consequently, the frequency of manual regeneration through operation of the manual regeneration switch is markedly reduced, improving ease of operation for the driver.

The above explanation deals with the example of a continuous regeneration-type DPF device in the exhaust gas purification system realized as a continuous regeneration-type DPF device providing an oxidation catalyst on the upstream side of the filter while also making a catalyst supported on the filter; however, the present invention is not restricted to this embodiment. Furthermore, the continuous regeneration-type DPF device may also be of the type making an oxidation catalyst supported on the filter or providing an oxidation catalyst on the upstream side of the filter, etc.

What is claimed is:

1. A control method of an exhaust gas purification system, in an internal combustion engine mounted on a vehicle provided with a continuous regeneration-type diesel particulate filter in the exhaust gas passage thereof, having a diesel particulate filter control means including:
   a collecting quantity detection means for detecting the collecting quantity of collected matters in the continuous regeneration-type diesel particulate filter;
   a forced regeneration control means for performing multi-injection in the control of fuel injection into cylinder for raising exhaust gas temperature, burning forcibly the collected matters and thereby regenerating the continuous regeneration-type diesel particulate filter;
   a warning means for urging a warning for prompting a driver to actuate the forced regeneration control means, in a case of detecting that the collecting quantity detected by the collecting quantity detection means is higher than a predetermined judgment collecting quantity; and
   a travel distance detection means for detecting a travel distance of the vehicle;
   wherein said diesel particulate filter control means comprises an exhaust gas temperature raising control means for performing an exhaust gas temperature raising control by at least one of multi-injection or post-injection in the control of fuel injection into cylinder in a case where the collecting quantity detected by the collecting quantity detection means exceeds a predetermined first temperature rising judgment collecting quantity lower than a predetermined judgment collecting quantity and, thereafter, for stopping the exhaust gas temperature raising control by at least one of multi-injection or post-injection in the control of fuel injection into cylinder in a case where the collecting quantity detected by the collecting quantity detection means becomes lower than a predetermined second temperature rising judgment collecting quantity lower than the predetermined first temperature rising judgment collecting quantity; and
   wherein said diesel particulate filter control means is composed not to urge by the warning means, in a case where it is judged that the travel distance after the collection starts detected by said travel distance detection means has not attained a predetermined judgment travel distance, even if it is detected that the collecting quantity detected by the collecting quantity detection means is larger than the predetermined judgment collecting quantity.

2. An exhaust gas purification system, in an internal combustion engine mounted on a vehicle provided with a continuous regeneration-type diesel particulate filter in the exhaust gas passage thereof, having a diesel particulate filter control means including:
   a collecting quantity detection means for detecting the collecting quantity of collected matters in the continuous regeneration-type diesel particulate filter;
   a forced regeneration control means for performing multi-injection in the control of fuel injection into cylinder for raising exhaust gas temperature, burning forcibly collected matters and thereby regenerating the continuous regeneration-type diesel particulate filter;
   a warning means for urging a warning for prompting a driver to actuate the forced regeneration control means, in a case of detecting that the collecting quantity by the collecting quantity detection means is higher than a predetermined judgment collecting quantity; and
   a travel distance detection means for detecting a travel distance of the vehicle;
   wherein said diesel particulate filter control means comprises an exhaust gas temperature raising control means for performing an exhaust gas temperature raising control by at least one of multi-injection or post-injection in the control of fuel injection into cylinder in a case where the collecting quantity detected by the collecting quantity detection means exceeds a predetermined first temperature rising judgment collecting quantity lower than a predetermined collecting quantity and, thereafter, for stopping the exhaust gas temperature raising control by at least one of multi-injection or post-injection in the control of fuel injection into cylinder in a case where the collecting quantity detected by the collecting quantity detection means becomes lower than a predetermined second temperature rising judgment collecting quantity lower than the predetermined first temperature rising judgment collecting quantity; and
   wherein said diesel particulate filter control means is composed not to urge by the warning means, in a case where it is judged that the travel distance after the collection starts detected by said travel distance detection means has not attained a predetermined judgment travel distance, even if it is detected that the collecting quantity detected by the collecting quantity detection means is larger than the predetermined judgment collecting quantity.

* * * * *